(12) United States Patent
Ehbing et al.

(10) Patent No.: US 7,504,052 B2
(45) Date of Patent: Mar. 17, 2009

(54) ANTISTATIC AND ELECTRICALLY CONDUCTIVE POLYURETHANES

(75) Inventors: Hubert Ehbing, Odenthal (DE); Jens Krause, Cologne (DE); Lutz Liebegott, Leverkusen (DE); Friedhelm Faehling, Cologne (DE); Norbert Eisen, Cologne (DE)

(73) Assignee: Bayer Material Science AG (DE)

( * ) Notice: Subject to any disclaimer, the term of this patent is extended or adjusted under 35 U.S.C. 154(b) by 0 days.

(21) Appl. No.: 11/890,768

(22) Filed: Aug. 7, 2007

(65) Prior Publication Data

US 2008/0035894 A1    Feb. 14, 2008

(30) Foreign Application Priority Data

Aug. 11, 2006    (DE) .................... 10 2006 037 582

(51) Int. Cl.
*H01B 1/24* (2006.01)

(52) U.S. Cl. ..................... 252/511; 250/515.1; 524/496

(58) Field of Classification Search .................. 252/511; 250/515.1; 523/137; 524/495, 496; 521/155
See application file for complete search history.

(56) References Cited

U.S. PATENT DOCUMENTS

| 4,526,952 | A  |   | 7/1985 | Zeitler et al. ................. 524/496 |
| 4,931,479 | A  | * | 6/1990 | Morgan ........................ 521/76 |
| 5,399,295 | A  | * | 3/1995 | Gamble et al. .............. 252/511 |
| 5,855,818 | A  | * | 1/1999 | Gan et al. .................... 252/511 |
| 6,528,572 | B1 | * | 3/2003 | Patel et al. ................... 524/495 |
| 2003/0181568 | A1 | * | 9/2003 | Amarasekera et al. ...... 524/495 |
| 2004/0144963 | A1 |   | 7/2004 | Braig et al. ................. 252/500 |

FOREIGN PATENT DOCUMENTS

| DE | 35 28 597 C2 | 2/1994 |
| DE | 198 58 825 C2 | 7/2002 |

* cited by examiner

*Primary Examiner*—Mark Kopec
(74) *Attorney, Agent, or Firm*—Connolly Bove Lodge & Hutz LLP

(57) ABSTRACT

The invention relates to antistatic and electrically conductive polyurethanes containing conductive carbon blacks and carbon fibers, and the use thereof.

9 Claims, No Drawings

_US 7,504,052 B2_

ANTISTATIC AND ELECTRICALLY CONDUCTIVE POLYURETHANES

FIELD OF THE INVENTION

The present invention relates to antistatic and electrically conductive polyurethanes containing conductive carbon blacks and carbon fibers, and the use thereof.

BACKGROUND OF THE INVENTION

Polyurethanes have been known for a long time and are distinguished by their great diversity. A review of polyurethanes, their properties and applications is given e.g. in Kunststoffhandbuch, volume 7, Polyurethane, $3^{rd}$ revised edition, volume 193, edited by Prof. Dr. G. W. Becker and Prof. Dr. D. Braun (Carl-Hanser Verlag, Munich, Vienna).

As well as flexible and rigid foams, non-foamed solid polyurethanes, such as e.g. cast elastomers, are also of interest. In particular, solid polyurethanes or polyurethanes with a bulk density of >500 kg/m$^3$ are employed in sectors where, in addition to outstanding material properties, antistatic and electrically conductive properties are also important. Sectors to be mentioned here are floor coverings, tires, paintable rolls, rollers and electrical encapsulation materials. Particularly in some highly sensitive technical equipment, it is essential that charges be avoided. Like most thermoplastic polymers, polyurethanes are not conductive per se. Common surface resistances are in the range of $10^{13}$ ohms.

Numerous additives are known to reduce this high resistance. Salts, such as e.g. ammonium salts (e.g. CATAFOR from Rhodia GmbH), were used very early on to reduce the surface resistance. Unfortunately, these additives have the disadvantage of accelerating hydrolysis in polyester polyol based polyurethanes. Moreover, migration to the surfaces and associated chalking are a great disadvantage. Added to this is the fact that the effects achieved are comparatively small and the surface resistance is reduced only by 2-3 powers of ten.

As well as the use of these salts, the use of conductive carbon black (e.g. conductive carbon black with a surface area of 600-1200 m$^2$/g according to BET; e.g. known. The use of conductive carbon black is described e.g. in EP-A 0 129 193 and DE-A 3 528 597. Good surface resistances can be achieved with conductive carbon blacks in foamed and unfoamed polyurethanes (up to $10^4$ ohms). However, the quantities of conductive carbon black required always lead to a very high viscosity of the reaction components, so that these systems can no longer be processed with the common polyurethane machines. These systems are therefore hardly ever used industrially. Substantially lower viscosities can be achieved by using carbon fibers—as described in DE-A 19 858 825. With relatively high concentrations of carbon fibers, surface resistances of less than $10^4$ ohms can be achieved with processing viscosities that are just acceptable. However, in application it is shown that the fibers break in parts subject to mechanical stress and the conductivity decreases very rapidly until a non-conductive polyurethane is present again. This breaking of the fibers already occurs during processing, and so PU systems of this type are not used on an industrial scale.

Furthermore, the use of graphites (e.g. COND 8/96 from Graphit Kopfmühl AG) is conceivable for the reduction of the electrical resistance. However, to obtain a useful conductivity, concentrations would be required in the polyurethane reaction system that would mean a considerable increase in viscosity and therefore would rule out industrial processing.

SUMMARY OF THE INVENTION

The present invention therefore provides antistatic and electrically conductive polyurethanes, the reaction components of which can be processed industrially, i.e. the reaction components and the mixture thereof have a sufficiently low viscosity, and the conductivity of which does not decrease with time or stress.

Surprisingly, it was possible to produce the inventive polyurethanes by adding conductive carbon black and carbon fibers in certain quantitative ratios.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

The present invention provides antistatic and electrically conductive, thermoset or thermoplastic polyurethanes, obtained by the reaction of an isocyanate with a compound containing NCO-reactive groups, with the optional addition of catalysts, blowing agents, auxiliary substances and additives, in which the polyurethanes contain (A) a conductive carbon black and (B) carbon fibers, the weight ratio of conductive carbon black (A) to carbon fibers (B) preferably being 1:2 to 1:15, more preferably 1:4 to 1:10, most preferably 1:4 to 1:8, and the total quantity of (A) and (B) preferably being 1 to 15 wt. %, more preferably 3 to 10 wt. %, most preferably 4 to 8 wt. %, based on the total weight of polyurethane.

The mixture of reaction components and additives used for the polyurethanes according to the invention has a viscosity sufficiently low that the mixture can be processed industrially. Under stress, the conductivity of the polyurethanes according to the invention is maintained.

Conductive carbon blacks with a surface area (measured by the BET method according to ASTM D 6556-04) of 600 to 1200 m$^2$/g, with an absorption pore volume (according to ASTM D 2414-05a with n-dibutyl phthalate) of 300 to 450 cm$^3$/100 g carbon black at about 23° C., a pour density (according to ASTM D 1513-05) of 20 to 250 kg/m$^3$ and with an average particle size diameter of less than 50 nm, more preferably 10 to 50 nm, may be included.

The carbon fibers preferably have a diameter, as measured through their thickness, of 2 μm to 10 μm, more preferably of 6 μm to 10 μm. Both cut and ground carbon fibers can be used.

The polyurethanes according to the invention preferably have bulk densities of 200 kg/m$^3$ to 1400 kg/m$^3$, more preferably of 600 kg/m$^3$ to 1400 kg/m$^3$ and most preferably of 800 kg/m$^3$ to 1400 kg/m$^3$.

The polyurethanes are preferably not thermoplastic.

Solid polyurethanes, e.g. cast elastomers, are preferred.

The polyurethanes according to the invention can additionally contain fillers, such as e.g. chalks, silicates, dolomites and aluminum hydroxides. These non-conductive fillers known in polyurethane chemistry can be present in concentrations of up to 25 wt. %, based on the polyurethane.

Surprisingly, it has been found that a low viscosity and a good conductivity are obtained with mixtures of conductive carbon black particles and carbon fibers.

The conductive carbon blacks are marketed e.g. with the names PRINTEX XE 2B from Degussa AG and KETJEN- BLACK EC from Akzo Nobel Polymer Chemicals by. The cut or ground carbon fibers are marketed e.g. with the name SIGRAFIL from SGL Carbon Group.

The polyurethanes according to the invention are used e.g. for paintable, electrically shielding and/or electrostatically dissipating materials, e.g. for floor coverings, tires, rolls, rollers, electrical encapsulation materials, housing parts and other technical parts.

The present invention is further illustrated, but is not to be limited, by the following examples. All quantities given in "parts" and "percents" are understood to be by weight, unless otherwise indicated.

Starting Components:

Polyol Component 1:

| | |
|---|---|
| 57.24 parts by weight | sucrose, propylene glycol-initiated polyether with a molecular weight of 600 g/mol (OH number: 450) based on 1,2-propylene oxide |
| 23.05 parts by weight | sucrose, ethylene glycol-initiated polyether with a molecular weight of 360 g/mol (OH number: 440) based on 1,2-propylene oxide |
| 17.45 parts by weight | trimethylolpropane-initiated polyether with a molecular weight of 660 g/mol (OH number: 255) based on ethylene oxide |
| 0.87 parts by weight | stabilizer B 8411 (Goldschmidt AG) |
| 1.04 parts by weight | activator DESMORAPID 726B |
| 0.35 parts by weight | water |

Polyol Component 2:

| | |
|---|---|
| 93.53 parts by weight | trimethylolpropane-initiated polyether with a molecular weight of 450 g/mol (OH number: 385) based on propylene oxide |
| 1.00 parts by weight | LUVISKOL K90 (BASF AG) |
| 0.10 parts by weight | dibutyltin dilaurate |
| 2.50 parts by weight | BAYLITH-L powder (zeolite from UOP LLC) |
| 0.47 parts by weight | water |

Polyol Component 3:
 Polyester polyol with an OH number of 56 mg KOH/mg, functionality 2, ethylene butylene adipate (VULKOLLAN 2010i)

Polyol Component 4:

| | |
|---|---|
| 47.04 parts by weight | DE 3170 (sorbitol-, water-initiated polyether polyol with terminal ethylene oxide groups with an OH number of 100 mg KOH/g and a viscosity at 25° C. of 720 mPas) |
| 47.04 parts by weight | L300 (linear polyether polyol with ethylene oxide and an OH number of 190 mg KOH/g and a viscosity at 25° C. of 120 mPas) |
| 0.99 parts by weight | TEGOSTAB 8411 (polyether polysiloxane copolymer) |
| 0.99 parts by weight | ethylene glycol |
| 0.81 parts by weight | DABCO 33LV catalyst (Air Products) |

Polyol Component 5:

| | |
|---|---|
| 91.7 parts by weight | trimethylolpropane-initiated polyether with a molecular weight of 450 g/mol (OH number: 385) based on propylene oxide |
| 0.10 parts by weight | dibutyltin dilaurate |
| 2.50 parts by weight | BAYLITH-L powder (zeolite from UOP LLC) |

Isocyanate 1:
 DESMODUR 44V10L (polyisocyanate mixture from the diphenylmethane series; NCO content: 31.5 wt. %; viscosity (25° C.): 100 mPas)

Isocyanate 2:
 DESMODUR 44P90; NCO content: 28.5 wt. %; viscosity (25° C.): 130 mPas)

Isocyanate 3:
 DESMODUR 15; 1,5-naphthalene diisocyanate

Isocyanate 4:
 DESMODUR PF; prepolymer based on 4,4'-diphenylmethane diisocyanate and tripropylene glycol with an NCO content of 23 wt. % and a viscosity of 650 mPas at 25° C.

EXAMPLE 1 (COMPARATIVE)

POLYOL COMPONENT 1 was stirred for 90 seconds with the carbon fiber SIGRAFIL C10 M250 UNS and ISOCYANATE 1 according to the composition given in the table, using a Pendraulik stirrer at a speed of 4500 rpm, and compacted in a closed mould to a bulk density of 500 kg/m$^3$.

EXAMPLE 2 (COMPARATIVE)

POLYOL COMPONENT 1 was stirred for 90 seconds with the conductive carbon black KETJENBLACK EC 600 JD and ISOCYANATE 1 according to the composition given in the table, using a Pendraulik stirrer at a speed of 4500 rpm, and compacted in a closed mould to a bulk density of 500 kg/m$^3$.

EXAMPLE 3 (INVENTION)

POLYOL COMPONENT 1 was stirred for 90 seconds with the conductive carbon black KETJENBLACK EC 600 JD, the carbon fiber SIGRAFIL C10 M250 UNS and ISOCYANATE 1 according to the composition given in the table, using a Pendraulik stirrer at a speed of 4500 rpm, and compacted in a closed mold to a bulk density of 500 kg/m$^3$.

EXAMPLE 4 (COMPARATIVE)

An attempt was made to mix POLYOL COMPONENT 2 with carbon nanotubes (BAYTUBES C 150 P), the carbon fiber SIGRAFIL C10 M250 UNS and ISOCYANATE 2 according to the composition given in the table, using a Pendraulik stirrer. Processing was impossible, and so no moldings could be produced and no conductivity measurements could be taken.

EXAMPLE 5 (COMPARATIVE)

It was attempted to mix POLYOL COMPONENT 2 with carbon nanotubes (BAYTUBES C 150 P), COND 8/96 graphite and ISOCYANATE 2 according to the composition given in the table, using a Pendraulik stirrer. Processing was impossible, and so no moldings could be produced and no conductivity measurements could be taken.

EXAMPLE 6 (INVENTION)

POLYOL COMPONENT 3 was mixed for 90 seconds with the conductive carbon black KETJENBLACK EC 600 JD and the conductive fiber SIGRAFIL C25 S006 PUT according to the composition given in the table, using a Pendraulik stirrer at 4500 rpm. This mixture was reacted at 127° C. with 25 parts by weight of 1,5-naphthalene diisocyanate. Crosslinking was performed with 5.0 parts by weight of 1,4-butanediol and a test plate was cast. The conductivities given in the table were determined on this plate in accordance with DIN IEC 60093.

EXAMPLE 7 (COMPARATIVE)

100 parts by weight of POLYOL COMPONENT 3 were reacted at 127° C. with 25 parts by weight of 1,5-naphthalene diisocyanate. Crosslinking was performed with 5 parts by weight of 1,4-butanediol and a test plate was cast. The volume resistivity determined on this plate in accordance with DIN IEC 60093 was higher by a factor of 106 compared with Example 6.

EXAMPLE 8 (INVENTION)

96.87 parts by weight of POLYOL COMPONENT 4 were mixed with 0.54 parts by weight of KETJENBLACK EC 600 JD conductive carbon black and 2.15 parts by weight of SIGRAFIL C10 M250 UNS carbon fibers at room temperature. The mixture was dispersed for 60 minutes in vacuo (<1 mbar) in a high-speed mixer at 1100 rpm. The diameters of the container and disk of the high-speed mixer were 16 mm and 5 mm respectively. For the subsequent foaming to a bulk density of approx. 400 kg/m$^3$, 0.45 wt. % water was added. The resulting mixture was flowable and pumpable.

62.44 parts by weight of ISOCYANATE COMPONENT 4 were mixed with 2.15 parts by weight of KETJENBLACK EC 600 JD conductive carbon black and 0.54 parts by weight of SIGRAFIL C10 M250 UNS carbon fibers at room temperature. The mixture was dispersed for over 90 minutes at room temperature and under a pressure of <1 mbar at 1100 rpm. The diameters of the container and disk of the high-speed mixer were 16 mm and 5 mm respectively. The resulting mixture was flowable and pumpable.

The polyol and isocyanate batches (including fibers and carbon black) were mixed in a ratio of 100:65.13 by high pressure injection mixing at a product temperature of 60° C. The reaction mixture was discharged into a closed mold, temperature-controlled at 60° C. The surface resistance and volume resistivity measurements were then taken on 10 mm thick plates in accordance with DIN IEC 60093. With $4\times10^6$ ohms for the surface resistance and $6\times10^3$ ohmcm for the volume resistivity, the values were significantly lower than those conventional for these polyurethanes (without the addition of carbon black and carbon fibers), i.e. $10^{10}$ to $10^{14}$ ohms and $10^{10}$ to $10^{14}$ ohmcm respectively.

EXAMPLE 9 (COMPARATIVE)

6.1 parts by weight of COND 8/96 graphite and 2.2 parts by weight of BAYTUBES C 150 P (carbon nanotubes) were added to 94.3 parts by weight of polyol, with stirring. The dispersion thus obtained was homogenized three times using a high-pressure homogenizer (Micron Lab 40, APV, Unna) at 1000 bar. The polyol dispersion was not pumpable, and so industrial processing by machine was impossible.

The dispersion was stirred for 90 seconds with the ISOCYANATE 2 corresponding to the composition given in the table, using a Pendraulik stirrer at a speed of 4500 rpm. Processing was extremely difficult. The resistances listed in the table were determined on the reaction mixture poured out on to a plate.

In the Table below,

TABLE

| | Example | | | | | | | | |
|---|---|---|---|---|---|---|---|---|---|
| | 1 | 2 | 3 | 4 | 5 | 6 | 7 | 8 | 9 |
| POLYOL COMP. 1 [pts. by wt.] | 100 | 100 | 100 | | | | | | |
| POLYOL COMP. 2 [pts. by wt.] | | | | 97.6 | 97.6 | | | | |
| POLYOL COMP. 3 [pts. by wt.] | | | | | | 100 | 100 | | |
| POLYOL COMP. 4 [pts. by wt.] | | | | | | | | 96.87 | |
| POLYOL COMP. 5 [pts. by wt.] | | | | | | | | | 94.3 |
| Crosslinker: 1,4-butanediol | | | | | | 5 | 5 | | |
| Water | | | | | | | | 0.45 | |
| Conductive carbon black, KETJENBLACK EC 600 | — | 2 | 1 | — | — | 0.88 | — | 1.08 | — |
| Carbon fibers, SIGRAFIL C 10M250 UNS | 20 | — | 9.5 | 7.45 | — | | — | 4.30 | — |
| Carbon fibers, SIGRAFIL C 25S 006 PUT | | | | | | 4.17 | | | |
| Graphite, COND 8/96 | — | — | — | — | 7.45 | — | — | — | 6.1 |
| BAYTUBES C 150 P carbon nanotubes | — | — | — | 5 | 5 | — | — | — | 2.2 |
| ISOCYANATE 1 | 120 | 120 | 120 | | | | | | |
| ISOCYANATE 2 | | | | 106.1 | 106.1 | | | | 96.2 |
| ISOCYANATE 3 | | | | | | 27 | 27 | | |
| ISOCYANATE 4 | | | | | | | | 62.44 | |
| Ref. no. | 105 | 105 | 105 | 105 | 105 | 113 | 113 | 105 | 105 |
| Density [kg/m$^3$] | 500 | 500 | 500 | Comp. | Comp. | Comp. | Comp. | 400 | |
| Surface resistance* [Ω] | $9\times10^{14}$ | $8\times10^{14}$ | $3.9\times10^{14}$ | n.m. | n.m. | $7.2\times10^6$ | $4.3\times10^{13}$ | $4\times10^6$ | $6\times10^4$ |
| Volume resistivity* [Ω cm] | $3.5\times10^8$ | $3\times10^8$ | $4.5\times10^4$ | n.m. | n.m. | $8.2\times10^3$ | $7.4\times10^9$ | $6\times10^3$ | $5\times10^4$ |
| Conductive carbon black [wt. %] i.E. | | 0.9 | 0.43 | | | 0.64 | | 0.65 | |
| Carbon fibres [wt. %] i.E. | 8.3 | | 4.1 | 3.5 | | 3.04 | | 2.6 | |
| Carbon nanotubes [%] i.E. | | | | 2.3 | 2.3 | | | | 1.11 |
| Graphite [wt. %] i.E. | | | | | 3.5 | | | | 3.07 |

*The resistivities were measured in accordance with DIN IEC 60093.
n.p. not processable; no parts could be produced
n.m. no surface resistance or volume resistivity could be measured
o.l.p. processing could only be achieved in the laboratory with great difficulty; however, conductivities could be determined; industrial processing in a processing machine was impossible
i.E. in the PU elastomer Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An antistatic and electrically conductive, thermoset or thermoplastic polyurethane produced by reacting at least one isocyanate with at least one compound containing NCO-reactive groups, optionally in the presence of one or more selected from catalysts, blowing agents, auxiliary substances and additives, wherein the polyurethanes contain
   A) conductive carbon black and
   B) carbon fibers,
in a weight ratio of conductive carbon black (A) to carbon fibers (B) of about 1:2 to about 1:15 and the total quantity of (A) and (B) is about 1 to about 15 wt. %, based on the total weight of polyurethane and the carbon fibers have a diameter from about 6 μm to about 10 μm.

2. The polyurethane according to claim 1, wherein the weight ratio of conductive carbon black (A) to carbon fibers (B) is about 1:4 to about 1:10.

3. The polyurethane according to claim 1, wherein the weight ratio of conductive carbon black (A) to carbon fibers (B) is about 1:4 to about 1:8.

4. The polyurethane according to claim 1, wherein the conductive carbon black has a surface area (measured by the BET method according to ASTM D 6556-04) of about 600 to about 1200 $m^2/g$, an absorption pore volume (according to ASTM D 2414-05a with the absorbent n-dibutyl phthalate at about 23° C.) of about 300 to about 450 $cm^3/100$ g carbon black, a pour density (according to ASTM D 1513-05) of about 20 to about 250 $kg/m^3$ and an average particle size diameter of less than about 50 nm, and the carbon fibers have a diameter, measured through their thickness, of about 2 μm to about 10 μm.

5. The polyurethane according to claim 1, wherein the polyurethane is thermoset.

6. The polyurethane according to claim 1, wherein the bulk density (according to DIN EN ISO 845-1995-06) is about 200 $kg/m^3$ to about 1400 $kg/m^3$.

7. The polyurethane according to claim 1, wherein that the polyurethane is a solid.

8. In one of a paintable, an electrically shielding and an electrostatically dissipating material, the improvement comprising including the polyurethane according to claim 1.

9. The polyurethane according to claim 1, wherein the carbon fibers have a diameter from 6 μm to 10 μm.

* * * * *